(12) United States Patent
Al

(10) Patent No.: US 10,437,085 B2
(45) Date of Patent: Oct. 8, 2019

(54) ROLLING APPARATUS AND ROLLING METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui Province (CN)

(72) Inventor: Yu Al, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 1063 days.

(21) Appl. No.: 14/822,972

(22) Filed: Aug. 11, 2015

(65) Prior Publication Data

US 2016/0282643 A1 Sep. 29, 2016

(30) Foreign Application Priority Data

Mar. 23, 2015 (CN) .......................... 2015 1 0128143

(51) Int. Cl.
*G01R 31/26* (2014.01)
*G02F 1/13* (2006.01)

(52) U.S. Cl.
CPC .......... *G02F 1/1309* (2013.01); *G02F 1/1303* (2013.01)

(58) Field of Classification Search
USPC ........................ 324/760.01; 356/237.1, 237.3
See application file for complete search history.

(56) References Cited

U.S. PATENT DOCUMENTS

| 8,061,172 B2 * | 11/2011 | Gravier ................... B21D 5/14 72/171 |
| 2004/0100612 A1 * | 5/2004 | Choo .................... G02F 1/1309 349/192 |

(Continued)

FOREIGN PATENT DOCUMENTS

| CN | 1737649 A | 2/2006 |
| CN | 101981494 A | 2/2011 |

(Continued)

OTHER PUBLICATIONS

First Chinese Office Action dated Jan. 25, 2017; Appln. No. 201510128143.5.

(Continued)

*Primary Examiner* — Rodney E Fuller

(57) ABSTRACT

A rolling apparatus, comprising a mounting bracket, a supporting platform and a rolling device; the mounting bracket is disposed above the supporting platform, and the rolling device is disposed on the mounting bracket so as to be located above the supporting platform; wherein the supporting platform is configured to support a display panel thereon; and the rolling device is configured to perform a rolling process on the display panel at a predetermined pressure. A rolling method, comprising supporting a display panel; and rolling the display panel at a predetermined pressure to cause an observable defection resulted from a foreign substance within the display panel. With the rolling apparatus and the rolling method, the display panel containing foreign substance will be detected as a defective product during the Cell Test so as not to enter the modular process, thereby avoiding any waste of module materials.

14 Claims, 5 Drawing Sheets

(56) References Cited

U.S. PATENT DOCUMENTS

| | | | |
|---|---|---|---|
| 2005/0018119 A1* | 1/2005 | Takeda | G02F 1/133707 |
| | | | 349/130 |
| 2010/0186890 A1* | 7/2010 | Kitada | B32B 38/185 |
| | | | 156/256 |
| 2011/0025363 A1* | 2/2011 | Sumi | G02F 1/1303 |
| | | | 324/760.01 |
| 2011/0315297 A1* | 12/2011 | Koshio | G02F 1/1309 |
| | | | 156/64 |
| 2018/0164889 A1* | 6/2018 | Ham | G06F 3/016 |

FOREIGN PATENT DOCUMENTS

| | | |
|---|---|---|
| CN | 102621155 A | 8/2012 |
| CN | 102636891 A | 8/2012 |
| JP | 63-293581 A | 11/1988 |
| JP | 2007-316327 A | 12/2007 |

OTHER PUBLICATIONS

The Second Chinese Office Action dated Jun. 19, 2017; Appln. No. 201510128143.5.

* cited by examiner

ROLLING APPARATUS AND ROLLING METHOD

TECHNICAL FILED

Embodiments of the present invention relate to a rolling apparatus and a rolling method.

BACKGROUND

Foreign substances may be generated within a display panel during an existing cell-assembling process of a liquid crystal display (LCD). In case where the foreign substance has a size which is not sufficient to cause a significant variation in a panel gap value of the display panel, the display panel will pass the cell test as a good product but will be detected as a defective product during the module test when the foreign substance exerts an external force onto the display panel to crush a metal wire at a thin film transistor (TFT) side or to conduct an Indium Tin Oxide (ITO) electrode at the TFT side with an ITO electrode at a color filter (CF) side within the display panel, which may result in waste of materials.

SUMMARY

At least one embodiment of the present invention provides a rolling apparatus and a rolling method thereof, which can solve technical problems in the existing technology that a display panel containing a foreign substance may pass the cell test as a good product in a Cell Test during cell-assembling process but will be detected as a defective product in a module process.

In one aspect, embodiments of the present invention provide a rolling apparatus, comprising a mounting bracket, a supporting platform and a rolling device, wherein the mounting bracket is disposed above the supporting platform, and the rolling device is disposed on the mounting bracket so as to be located above the supporting platform; wherein the supporting platform is configured to support a display panel thereon; and the rolling device is configured to perform a rolling process on the display panel at a predetermined pressure.

In another aspect, embodiments of the present invention provide a rolling method, comprising: supporting a display panel; and performing a rolling process on the display panel at a predetermined pressure to cause an observable defection resulted from a foreign substance within the display panel.

In still another aspect, embodiments of the present invention provide a rolling method of rolling apparatus, comprising: supporting a display panel through the supporting platform; and rolling the display panel at a predetermined pressure through the rolling device to cause an observable defection resulted from a foreign substance within the display panel.

Upon performing a rolling process with the rolling apparatus and the rolling method as provided by embodiments of the present invention, the foreign substance within the display panel will, for example, crush a metal wire at a thin film transistor (TFT) side or to conduct an Indium Tin Oxide (ITO) electrode at the TFT side with an ITO electrode at a color filter (CF) side to cause the display panel to present an observable defection, for example, a line defection, during the Cell Test; in this way, said display panel will be taken way by an operator during the Cell Test so as not to enter the module process, thereby avoiding any waste of module materials.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 1:
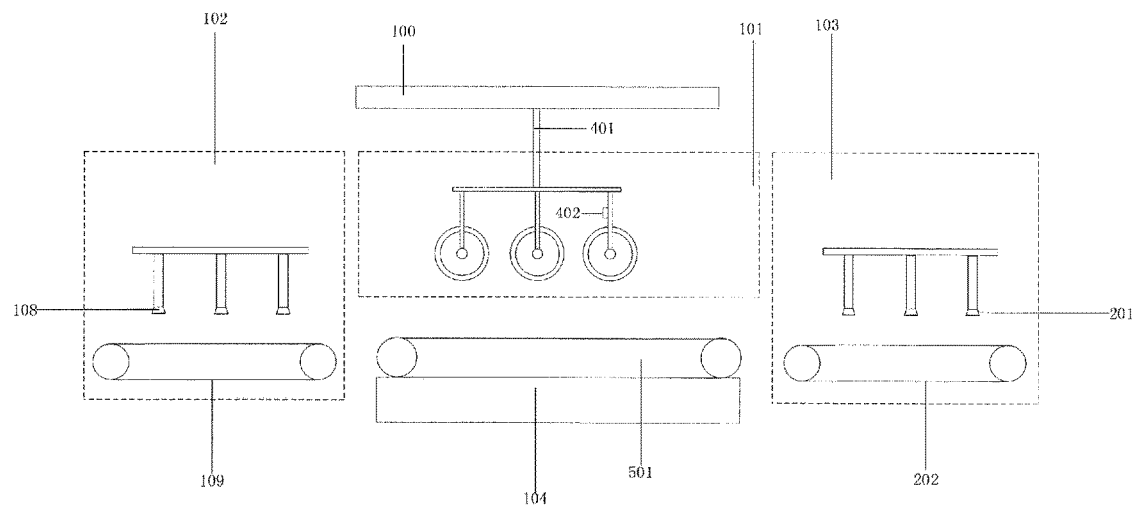
FIG. 1 is a schematically structural diagram of a rolling apparatus as provided by an embodiment of the present invention.
Figure 2:
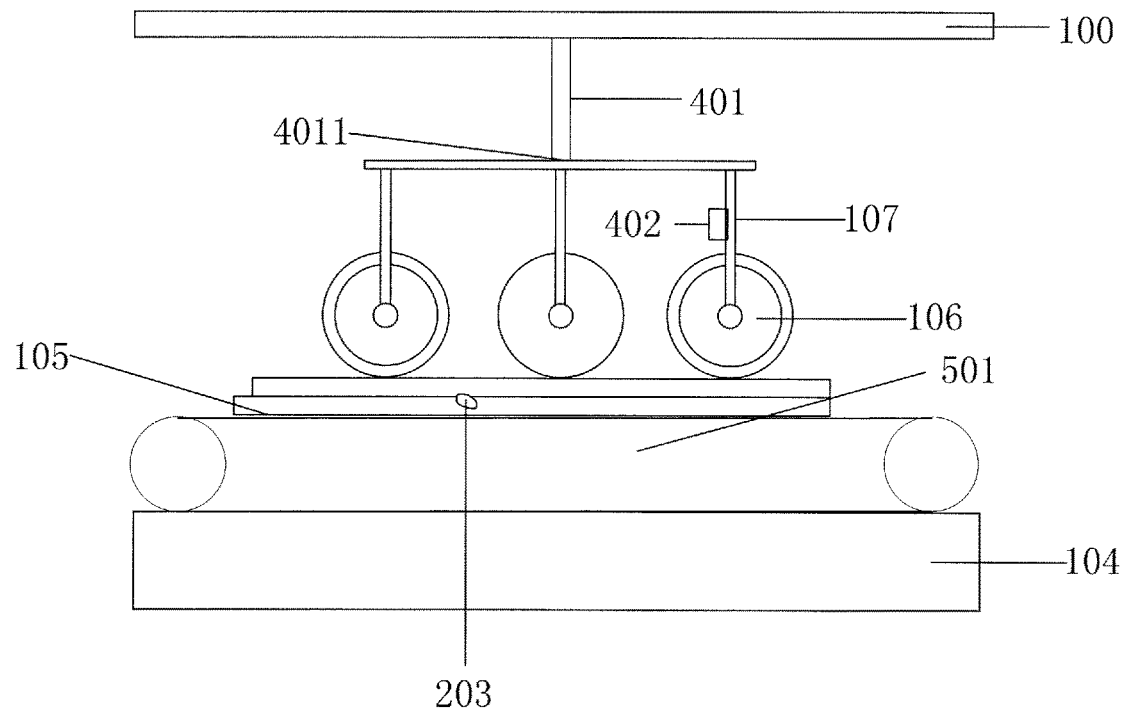
FIG. 2 is a schematically structural diagram of a rolling device in the rolling apparatus as illustrated in FIG. 1.

FIG. 1 is a schematically structural diagram of a rolling apparatus as provided by an embodiment of the present invention, and FIG. 2 is a schematically structural diagram of a rolling device in the rolling apparatus as illustrated in FIG. 1. As illustrated in FIGS. 1-2, the rolling apparatus as provided by embodiments of the present invention comprises a mounting bracket 100, a rolling device 101 and a supporting platform 104. The mounting bracket 100 is disposed above the supporting platform 104, and the rolling device 101 is disposed on the mounting bracket 100 so as to be located above the supporting platform 104.

During a cutting process procedure, the rolling apparatus as provided by embodiments of the present invention is disposed behind a cleaning device and in front of an optical inspector. For example, a display panel is fed into a cutting machine through an entrance of the cutting process procedure, subject to a grinding and polishing process in an edge finishing machine upon being cut, subject to a cleaning process in the cleaning machine upon being edge-finished, and then subject to a rolling process in the rolling apparatus as provided by embodiments of the present application upon being cleaned. Subsequently, the display panel has been subject to the rolling process is detected in the optical detector and then is discharged from an exit of the cutting process procedure for a lighting detection process, through which the display panel being detected as a good product will enter the module process.

In an embodiment of the present invention, the supporting platform 104 supports a display panel 105 thereon, and the rolling device 101 performs a rolling process on the display panel 105 at a predetermined pressure. A value of the predetermined pressure should be configured such that it's capable of causing an observable detection of the display panel resulted from a foreign substance 203 within the display panel 105 but causing no damage to the display panel 105 itself. For example, the predetermined pressure can be configured to crush a metal wire at a thin film transistor (TFT) side or to conduct an Indium Tin Oxide (ITO) electrode at the TFT side with an ITO electrode at a color filter (CF) side within the display panel. For example, the predetermined pressure may be 0.35~0.40 MPa. The display panel that has been subject to the rolling process will present a line defection in the lighting detection and hence will be taken away by an operator without entering the module process, thereby voiding any waste of module materials.

In an embodiment of the present invention, the rolling apparatus further comprises a first actuating mechanism 401 fixed above the rolling device 101 and below the mounting bracket 100 so as to connect the rolling device 101 and the mounting bracket 100. One end of the first actuating mechanism 401 that is connecting to the rolling device 101 is both extensible and retractable so as to change a distance between the rolling device 101 and the display panel 105. In this way, the first actuating mechanism 401 is capable of actuating the rolling device 101 in horizontal, to move the rolling device 101 to reach a predetermined rolling position above the supporting platform 104. For example, the predetermined rolling position allows a back surface of the display panel 105 being in contact with the supporting platform 104 and allows a front surface of the display panel 105 being in contact with the rolling device 101.

In an example, the first actuating mechanism is a telescopic arm driven by an electrical motor, but the present invention is not limited thereto. Instead, the first actuating mechanism in the rolling apparatus as provided by embodiments of the present invention can be implemented with any other mechanical, electromagnetic or hydraulic mechanisms having similar functions.

In an embodiment of the present invention, the supporting platform 104 is provided with a first belt conveyer 501, on which the display panel 105 is placed; the rolling device 101 comprises a holder 107, a second actuating mechanism 402 and at least one roller wheel 106, wherein the holder 107 and the second actuating mechanism 402 are fixed on the mounting bracket 100, and the roller wheel 106 is fixed on the holder 107 and is connecting to the second actuating mechanism 402. For example, the second actuating mechanism 402 can be a driving motor. FIG. 2 only illustrates a single, second actuating mechanism 402 connecting to a roller wheel 106 disposed at the right-most.

Figure 3:
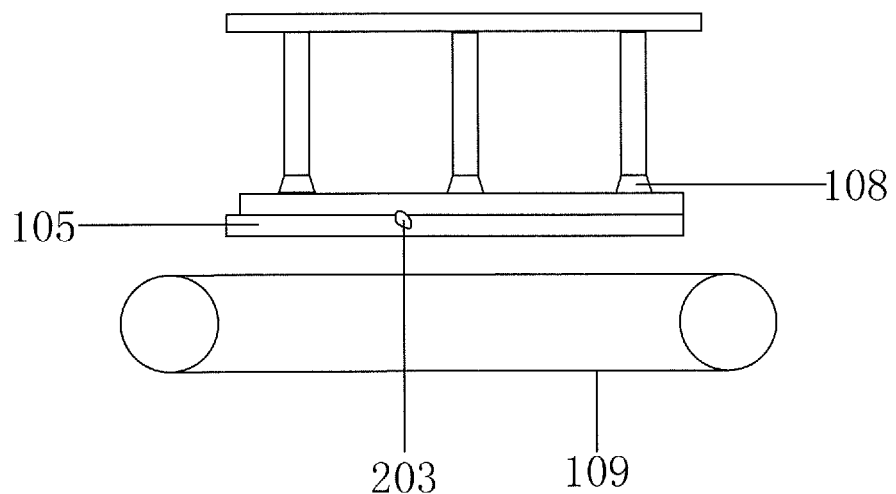
FIG. 3 is a schematically structural diagram of a feeding device in the rolling apparatus as illustrated in FIG. 1.

In an example, as illustrated in FIGS. 1-3, it's provided with three roller wheels 106. Those skilled in the art should be appreciated that other numbers of roller wheels 106 can be configured according to actual demands. In an example, a surface of the roller wheel 106 comprises flexible materials like silicon gel, for example. The second actuating mechanism 402 actuates the roller wheel 106 to rotate, and the first belt conveyer 501 drives the display panel 105 to move in horizontal. As previously described, a pressed depth of the roller wheel 106 is adjustable by means of the first actuating mechanism 401 such that the roller wheel 106 can apply a necessary pressure without any damage to the display panel 105. For example, the pressure can be 0.35~0.40 MPa. Upon the rolling process, the foreign substance 203, if exist, within the display panel 105 will crush the metal wire at the TFT side or conduct the ITO electrode at the TFT side with the ITO electrode at the CF side. In this way, this display panel 105 will present a line defection in the Cell Test, and hence will be taken away by the operator without entering the module process, thereby avoiding any waste of module materials.

Figure 4:
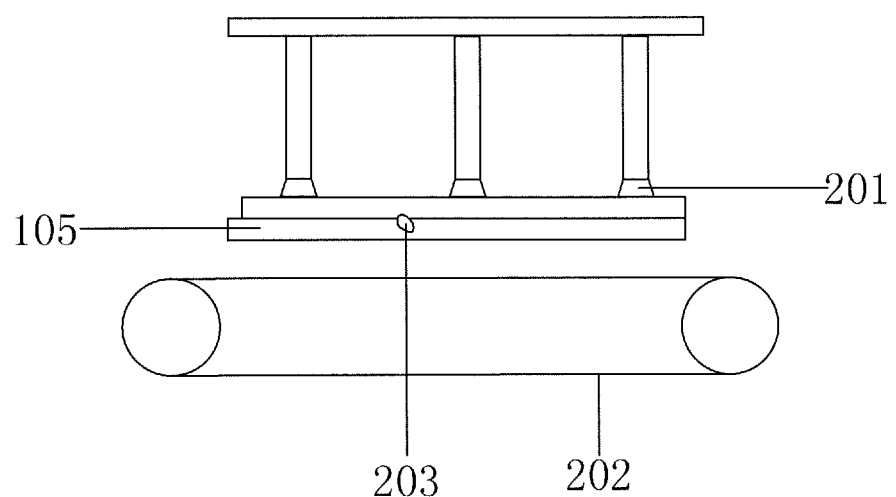
FIG. 4 is a schematically structural diagram of a discharging device in the rolling apparatus as illustrated in FIG. 1.

As illustrated in FIG. 1, in an embodiment of the present invention, the rolling apparatus further comprises a feeding device 102 and a discharging device 103. FIG. 3 is a schematically structural diagram of the feeding device 102 in the rolling apparatus as illustrated in FIG. 1, and FIG. 4 is a schematically structural diagram of the discharging device 103 in the rolling apparatus as illustrated in FIG. 1. As illustrated in FIGS. 1, 3 and 4, in an example, the feeding device 102 is disposed at a left side of the supporting platform 104 and the discharging device 103 is disposed at a right side of the supporting platform 104. When it needs to perform a rolling process on a display panel 105, the feeding device 102 feeds the display panel 105 and places the display panel 105 onto the supporting platform 104. When it finishes a rolling process on a display panel 105, the discharging device 103 picks up the display panel 105 from the supporting platform 104 and discharges the display panel 105.

In an example, the feeding device 102 comprises a first suction cup 108 and a second belt conveyer 109, wherein the first suction cup 108 is disposed above the second belt conveyer 109. The discharging device 103 comprises a second suction cup 201 and a third belt conveyer 202, wherein the second suction cup 201 is disposed above the third belt conveyer 202. The second belt conveyer 109 drives the display panel 105 to move in horizontal so as to feed the display panel 105; the first suction cup 108 picks up the display panel 105 and places the display panel 105 onto the supporting platform 104. The second suction cup 201 picks up the display panel 105 from the supporting platform 104 and places the display panel 105 onto the third belt conveyer 202 which drives the display panel 105 to move in horizontal so as to discharge the display panel 105.

The rolling apparatus as provided by embodiments of the present invention comprises a mounting bracket, a supporting platform and a rolling device. The mounting bracket is disposed above the supporting platform, and the rolling device is disposed on the mounting bracket so as to be located above the supporting platform; the supporting platform is configured to support a display panel thereon, and the rolling device is configured to perform a rolling process on the display panel at a predetermined pressure. Upon performing a rolling process with the rolling apparatus as provided by embodiments of the present invention, the foreign substance within the display panel will crush a metal wire at the TFT side or to conduct the ITO electrode at the TFT side with the ITO electrode at the CF side so that the display panel will present a line defection in the Cell Test and hence will be taken away by an operator without entering the module process, thereby avoiding any waste of module materials.

Figure 5:
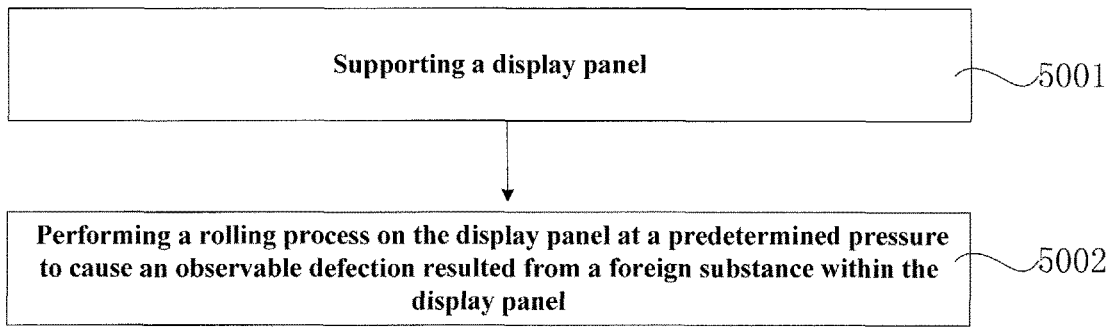
FIG. 5 is a flow chart illustrating a rolling method as provided by embodiments of the present invention.

FIG. 5 is a flow chart illustrating a rolling method as provided by embodiments of the present invention. As illustrated in FIG. 5, the rolling method comprises: S5001, supporting a display panel comprising, for example, a thin film transistor (TFT), a color filter (CF) and a Indium Tin Oxide (ITO) electrode; and S5002, performing a rolling process on the display panel at a predetermined pressure to cause an observable defection resulted from a foreign substance within the display panel, for example, it may cause a foreign substance within the display panel to crush a metal wire at the TFT side or to conduct the ITO electrode at the TFT side with the ITO electrode at the CF side within the display panel. In this way, the display panel will present a line defection in the Cell Test and hence will be taken away by an operator without entering the module process, thereby avoiding any waste of module materials.

Figure 6:
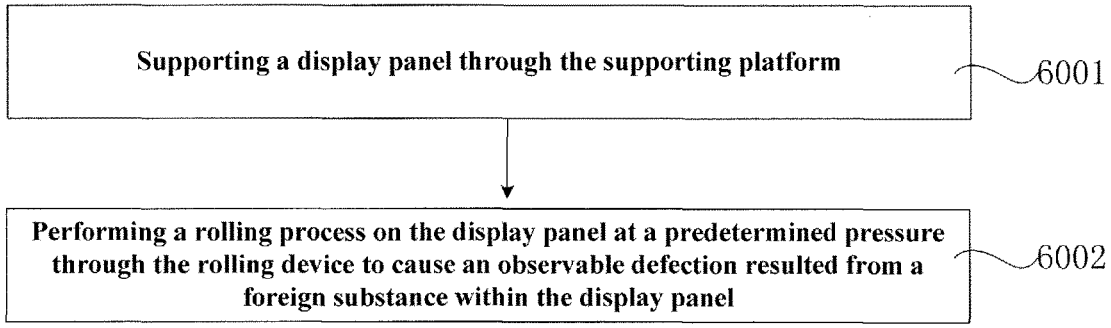
FIG. 6 is a flow chart illustrating a rolling method of rolling apparatus as provided by embodiments of the present invention.

FIG. 6 is a flow chart illustrating a rolling method of rolling apparatus as provided by embodiments of the present invention. The rolling apparatus may be those described as above with reference to FIGS. 1-4, comprising: a mounting bracket 100, a rolling device 101, a supporting platform 104, and optionally a feeding device 102 and a discharging device 103. The mounting bracket 100 is disposed above the supporting platform 104, and the rolling device 101 is disposed on the supporting platform 104 so as to be located above the supporting platform 104.

As illustrated in FIG. 6, the rolling device comprises: S6001, supporting a display panel 105 through the supporting platform 104; and S6002, performing a rolling process on the display panel 105 at a predetermined pressure through the rolling device 101 to cause an observable defection resulted from a foreign substance within the display panel.

In an embodiment of the present invention, the rolling apparatus further comprises a first actuating mechanism 401, wherein the first actuating mechanism 401 is fixed above the rolling device 101 and is fixed below the mounting bracket 100 so as to connect the rolling device 101 and the mounting bracket 100. One end 4011 of the first actuating mechanism 401 that is connecting to the rolling device 101 is configured to be both extensible and retractable so as to change a distance between the rolling device 101 and the display panel 105. Correspondingly, in an example, the rolling method further comprises: before the Step 6002, vertically actuating the rolling device through the first actuating mechanism so as to move the rolling device to a predetermined rolling position above the supporting platform. For example, the predetermined rolling position allows a back surface of the display panel 105 being in contact with the supporting platform 104 and allows a front surface of the display panel 105 being in contact with the rolling device 101.

In an embodiment of the present invention, the supporting platform 104 is provided with a first belt conveyer 501 on which the display panel 105 is supported; the rolling device 101 comprises a holder 107, a second actuating mechanism 402 and at least one roller wheel 106, wherein the holder 107 and the second actuating mechanism 402 are fixed on the mounting bracket 100, and the roller wheel 106 is fixed on the holder 107 and is connecting to the second actuating mechanism 402. Correspondingly, in an example, the Step 6002 of the rolling method comprises: actuating the roller wheel to rotate through the second actuating mechanism; and driving the display panel to move in horizontal through the first belt conveyer.

Figure 7:
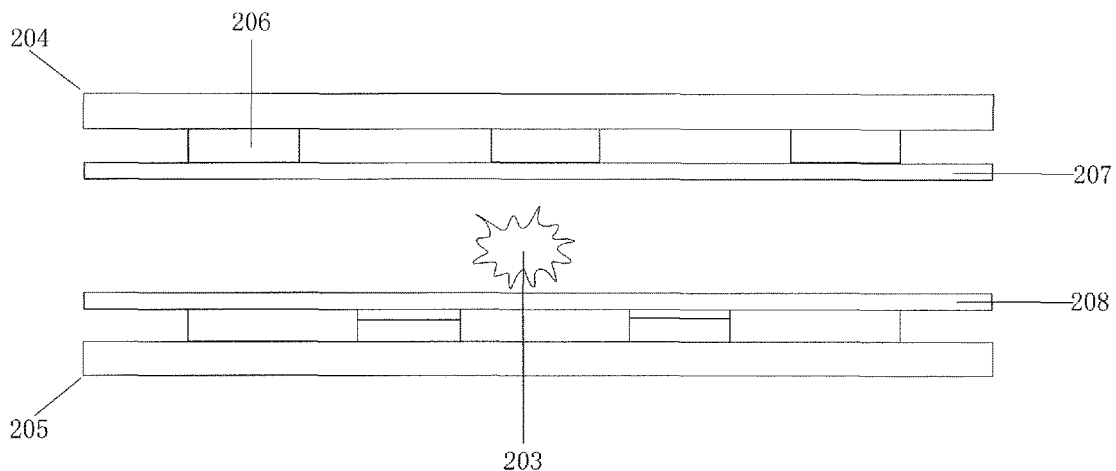
FIG. 7 is a sectional view illustrating a display panel containing a foreign substance before a rolling process performed according to the rolling method as provided by embodiments of the present invention.
Figure 8:
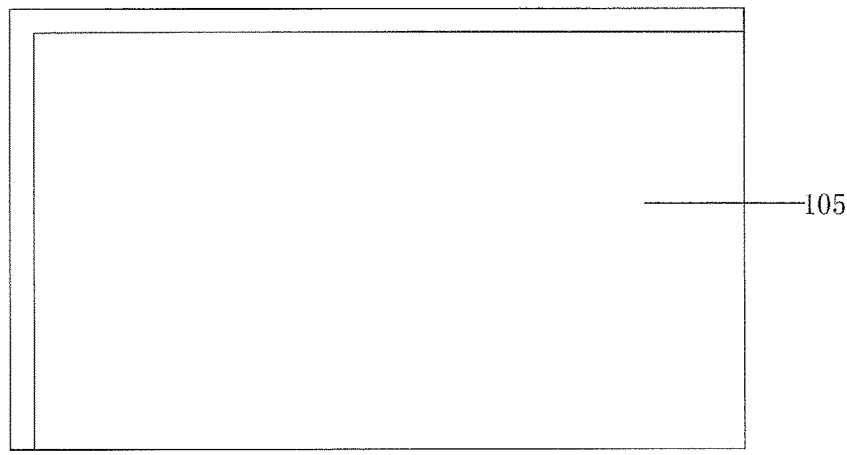
FIG. 8 is a detection image of the display panel as illustrated in FIG. 7 before a rolling process performed according to the rolling method as provided by embodiments of the present invention.

FIG. 7 is a sectional view illustrating a display panel containing a foreign substance before a rolling process performed according to the rolling method as provided by embodiments of the present invention; and FIG. 8 is a detection image of the display panel as illustrated in FIG. 7 before a rolling process performed according to the rolling method as provided by embodiments of the present invention. As illustrated in FIGS. 7-8, a foreign substance 203 is located between an array substrate 204 and a cooler filter (CF) substrate 205, but the display panel 105 will pass the Cell Test as a good product because a size of the foreign substance 203 is not enough to cause a significant variation in a Panel Gap value of the display panel.

Figure 9:
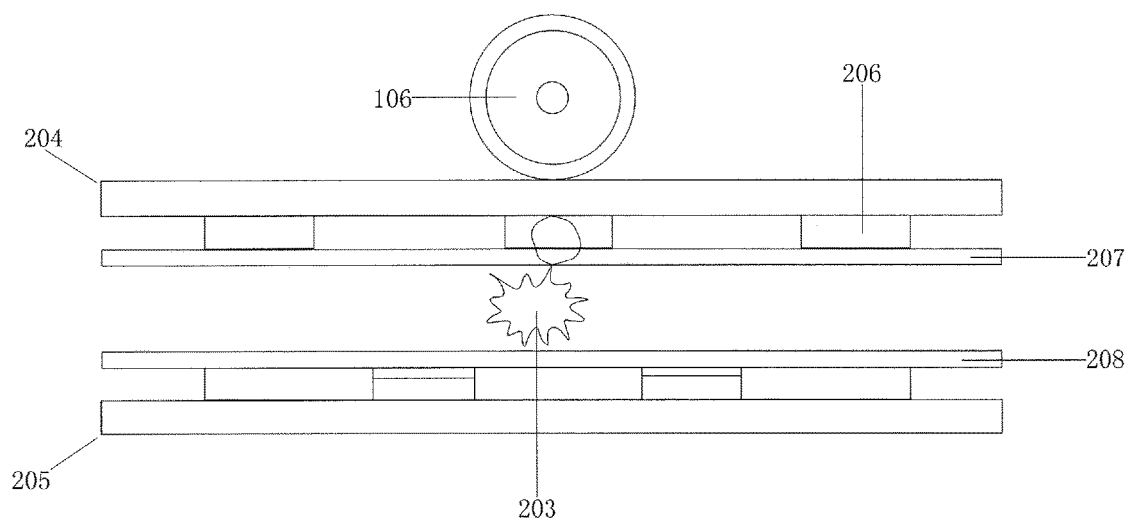
FIG. 9 is a sectional view illustrating a display panel containing a foreign substance after a rolling process performed according to the rolling method as provided by embodiments of the present invention.
Figure 10:
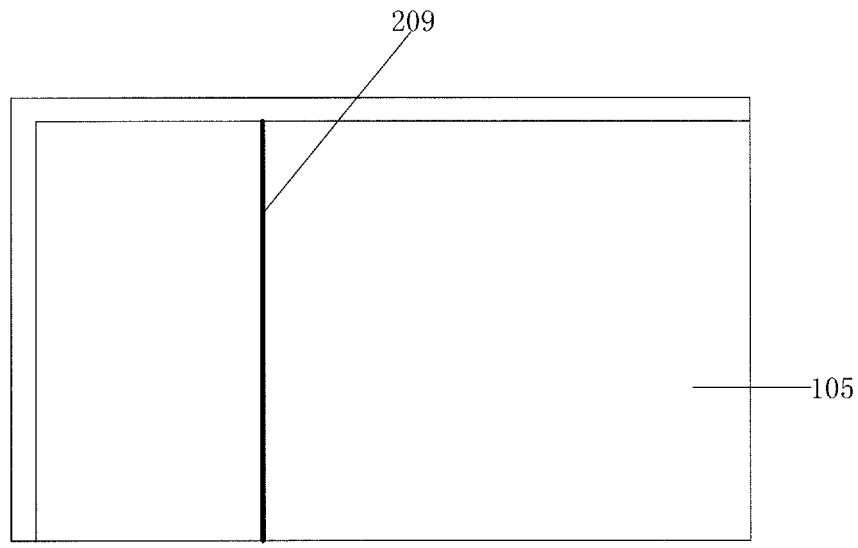
FIG. 10 is a detection image of the display panel as illustrated in FIG. 9 after a rolling process performed according to the rolling method as provided by embodiments of the present invention.
Figure 11:
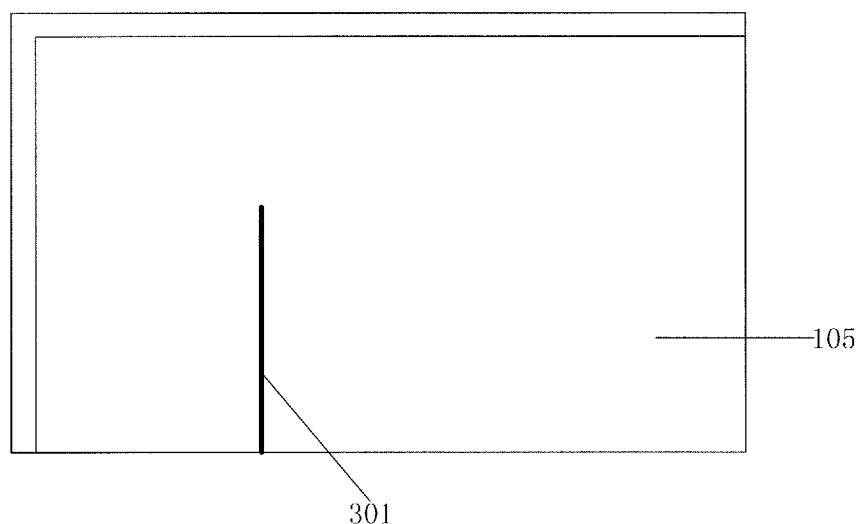
FIG. 11 is another detection image of the display panel as illustrated in FIG. 9 after a rolling process performed according to the rolling method as provided by embodiments of the present invention.

FIG. 9 is a sectional view illustrating a display panel containing a foreign substance after a rolling process performed according to the rolling method as provided by embodiments of the present invention; FIG. 10 is a detection image of the display panel as illustrated in FIG. 9 after a rolling process performed according to the rolling method as provided by embodiments of the present invention; and FIG. 11 is another detection image of the display panel as illustrated in FIG. 8 after a rolling process performed according to the rolling method as provided by embodiments of the present invention. As illustrated in FIG. 9, upon performing a rolling process with the rolling method as provided by embodiments of the present invention, the foreign substance 203 will crush a metal wire 206 or conduct a first ITO electrode 207 with a second ITO electrode 208. With reference to FIG. 10, in case where the first ITO electrode 207 is conducted with the second ITO electrode 208 in the display panel 105, a first light transmitting line 209 will be appeared in the longitudinal direction, which leads to a defection of penetrating bad line being detected during the Cell Test. With reference to FIG. 11, in case where the metal wire 206 in the display panel 105 is crushed under pressure, a second light transmitting line 301 will be appeared in the longitudinal direction which leads to a defection of non-penetrating bad line during the Cell Test. Since the above-mentioned display panel 105 will present a line defection in the Cell Test, it will be taken away by the operator as a defective product without entering the module process, thereby avoiding any waste of module materials.

With reference to FIG. 1 and FIGS. 3-4, in an embodiment of the present invention, the rolling apparatus further comprises a feeding device 102 and a discharging device 103. For example, the feeding device 102 is disposed at one side of the supporting platform 104 and the discharging device 103 is disposed at the other side of the supporting platform 104. Correspondingly, in an example, the rolling method further comprises: before the Step 6001, feeding a display panel 105 and placing the display panel 105 onto the supporting platform 104 through the feeding device 102. Moreover, in an example, the rolling method further comprises: after the Step 6002, picking up the display panel 105 from the supporting platform 104 and discharging the display panel 105 through the discharging device 103.

In an embodiment of the present invention, the feeding device 102 comprises a first suction cup 108 and a second belt conveyer 109, wherein the first suction cup 108 is disposed above the second belt conveyer 109; the discharging device 103 comprises a second suction cup 201 and a third belt conveyer 202, wherein the second suction cup 201 is disposed above the third belt conveyer 202. Correspondingly, in an example, the rolling method further comprises: before the Step 6001, driving the display panel 105 to move in horizontal so as to feed the display panel 105 through the second belt conveyer 109; and picking up the display panel 105 from the second belt conveyer 109 and placing the display panel 105 onto the supporting platform 104 through the first sucking cup 108. Moreover, The second suction cup is configured to pick up the display panel from the supporting platform and place the display panel onto the third belt conveyer. Moreover, in an example, the rolling method further comprises: after the Step 6002, picking up the display panel 105 from the supporting platform 104 and placing the display panel 105 onto the third belt conveyer 202 through the second sucking cup 201; and driving the display panel 105 to move in horizontal to discharge the display panel 105 through the third belt conveyer 202.

According to the rolling method of rolling apparatus as provided by embodiments of the present invention, the display panel is supported by the supporting platform of the rolling apparatus and then subject to a rolling process at predetermined pressure by the rolling device of the rolling apparatus to cause an observable defection resulted from a foreign substance within the display panel. With the rolling process performed by the rolling apparatus and/or according to the rolling method as provided by embodiments of the present invention, the foreign substance within the display panel will, for example, crush a metal wire at the TFT side or to conduct the ITO electrode at the TFT side with the ITO electrode at the CF side so as to cause an observable defection within the display panel, for example, a line defection; in this way, said display panel will be taken away by an operator without entering the module process, thereby avoiding any waste of module materials.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201510128143.5 filed on Mar. 23, 2015 titled "a rolling apparatus and a rolling method thereof", which is incorporated herein by reference in its entirely.

What is claimed is:

1. A rolling apparatus, comprising a mounting bracket, a supporting platform and a rolling device; the mounting bracket is disposed above the supporting platform, and the rolling device is disposed on the mounting bracket so as to be located above the supporting platform; wherein
   the supporting platform is configured to support a display panel thereon; and
   the rolling device comprises three roller wheels and a second actuating mechanism configured to actuate the roller wheels to rotate, the second actuating mechanism is a driving motor, a surface of each of the roller wheels is provided with silicone gel, and the rolling device is configured to perform a rolling process on the display panel at a predetermined pressure of 0.35 MPa-0.40 MPa, wherein
   the rolling apparatus further comprises:
   a first actuating mechanism connecting the mounting bracket and the rolling device, the first actuating mechanism is a telescopic arm driven by an electrical motor and is configured to vertically actuate the rolling device so as to move the rolling device to a predetermined rolling position above the supporting platform;
   a feeding device disposed at one side of the supporting platform, the feeding device comprises a first suction cup and a second belt conveyer, wherein the first suction cup is disposed above the second belt conveyer, and the feeding device is configured to feed a display panel and place the display panel onto the supporting platform; and
   a discharging device disposed at the other side of the supporting platform, the discharging device comprises a second suction cup and a third belt conveyer, wherein the second suction cup is disposed above the third belt conveyer, and the discharging device is configured to pick up the display panel from the supporting platform and discharge the display panel.

2. The rolling apparatus of claim 1, wherein an end of the first actuating mechanism that is connecting to the rolling device is configured to be both extensible and retractable.

3. The rolling apparatus of claim 1, wherein the supporting platform is provided with a first belt conveyer, on which the display panel is supported; the rolling device further comprises a holder, wherein the holder and the second actuating mechanism are fixed on the mounting bracket, and the roller wheels are fixed on the holder and are connected to the second actuating mechanism, wherein
   the first belt conveyer is configured to drive the display panel to move in horizontal.

4. The rolling apparatus of claim 1, wherein
   the second belt conveyer is configured to drive the display panel to move in horizontal to be beneath the first sucking cup;
   the first suction cup is configured to pick up the display panel from the second belt conveyer and place the display panel onto the supporting platform; and
   the second suction cup is configured to pick up the display panel from the supporting platform and place the display panel onto the third belt conveyer;
   the third belt conveyer is configured to drive the display panel to move in horizontal to discharge the display panel.

5. A rolling method of the rolling device, according to claim 1, comprising:
   supporting a display panel through the supporting platform; and performing a rolling process on the display panel at a predetermined pressure of 0.35 MPa-0.40 MPa through the rolling device to cause an observable defection resulted from a foreign substance within the display panel.

6. The rolling method of rolling apparatus of claim 5, wherein
the predetermined pressure causes the foreign substance to result in a line defection.

7. The rolling method of rolling apparatus of claim 6, wherein
the display panel comprises a thin film transistor (TFT), a color filter (CF) and Indium Tin Oxide (ITO) electrodes; and
the predetermined pressure causes the foreign substance to crush a metal wire at the TFT side or to conduct the ITO electrode at the TFT side with the ITO electrode at the CF side.

8. The rolling method of rolling apparatus of claim 7, further comprising:
before supporting a display panel through the supporting platform, feeding the display panel and placing the display panel onto the supporting platform through the feeding device; and
after performing a rolling process on the display panel at a predetermined pressure through the rolling device, picking up the display panel from the supporting platform and discharging the display panel through the discharging device.

9. The rolling method of rolling apparatus of claim 6, further comprising:
before supporting a display panel through the supporting platform, feeding the display panel and placing the display panel onto the supporting platform through the feeding device; and
after performing a rolling process on the display panel at a predetermined pressure through the rolling device, picking up the display panel from the supporting platform and discharging the display panel through the discharging device.

10. The rolling method of rolling device of claim 5, further comprising: before rolling the display panel at a predetermined pressure, vertically actuating the rolling device through the first actuating mechanism so as to move the rolling device to a predetermined rolling position above the supporting platform.

11. The rolling method of rolling apparatus of claim 10, wherein the predetermined rolling position allows a back surface of the display panel being in contact with the supporting platform and allows a front surface of the display panel being in contact with the rolling device.

12. The rolling method of rolling apparatus of claim 5, wherein the supporting platform is provided with a first belt conveyer, on which the display panel is supported; the rolling device further comprises a holder, wherein the holder and the second actuating mechanism are fixed on the mounting bracket, and the roller wheels are fixed on the holder and are connected to the second actuating mechanism, wherein
performing a rolling process on the display panel at a predetermined pressure comprises:
actuating the roller wheel to rotate through the second actuating mechanism; and
driving the display panel to move in horizontal through the first belt conveyer.

13. The rolling method of rolling apparatus of claim 5, further comprising:
before supporting a display panel through the supporting platform, feeding the display panel and placing the display panel onto the supporting platform through the feeding device; and
after performing a rolling process on the display panel at a predetermined pressure through the rolling device, picking up the display panel from the supporting platform and discharging the display panel through the discharging device.

14. The rolling method of rolling apparatus of claim 13, wherein
feeding the display panel and placing the display panel onto the supporting platform through the feeding device comprises: driving the display panel to move in horizontal to be beneath the first suction cup through the second belt conveyer; and picking up the display panel from the second belt conveyer and placing the display panel onto the supporting platform through the first sucking cup; and
picking up the display panel from the supporting platform and discharging the display panel through the discharging device comprises: picking up the display panel from the supporting platform and placing the display panel onto the third belt conveyer through the second sucking cup; and driving the display panel to move in horizontal to discharge the display panel through the third belt conveyer.

* * * * *